United States Patent
Shaffer et al.

(10) Patent No.: US 9,224,297 B2
(45) Date of Patent: Dec. 29, 2015

(54) PARK ASSIST OBJECT DISTANCE MEASUREMENT CLOCK CONTROL

(71) Applicant: FORD GLOBAL TECHNOLOGIES, LLC, Dearborn, MI (US)

(72) Inventors: Aric David Shaffer, Saline, MI (US); Vern Stempnik, Roseville, MI (US); Brian Choi, Ann Arbor, MI (US); Michael David Kane, Brighton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 13/868,338

(22) Filed: Apr. 23, 2013

(65) Prior Publication Data
US 2014/0313059 A1    Oct. 23, 2014

(51) Int. Cl.
*B60Q 1/48* (2006.01)
*G08G 1/14* (2006.01)
*B62D 15/02* (2006.01)
*G08G 1/16* (2006.01)

(52) U.S. Cl.
CPC ............. *G08G 1/14* (2013.01); *B62D 15/0285* (2013.01); *G08G 1/168* (2013.01)

(58) Field of Classification Search
CPC .............. B62D 15/027; B62D 15/028; B62D 15/0285; G08G 1/167; G08G 1/168; G08G 1/142; G08G 1/14; B60W 30/06; B60W 30/08; B60W 2050/146; G01S 2013/9314; B60R 2300/806
USPC ......... 340/932.2, 933, 435, 436, 437; 701/41, 701/300, 301, 302; 367/87, 99; 180/271, 180/274
See application file for complete search history.

(56) References Cited

U.S. PATENT DOCUMENTS

| | | | |
|---|---|---|---|
| 5,742,141 A * | 4/1998 | Czekaj | 318/587 |
| 6,492,902 B2 * | 12/2002 | Nishimoto et al. | 340/506 |
| 8,255,144 B2 | 8/2012 | Breed et al. | |
| 2004/0016870 A1 * | 1/2004 | Pawlicki et al. | 250/208.1 |
| 2005/0180530 A1 * | 8/2005 | Reiche | 375/317 |
| 2007/0279199 A1 * | 12/2007 | Danz et al. | 340/435 |
| 2008/0218324 A1 * | 9/2008 | Li | 340/435 |
| 2010/0302069 A1 * | 12/2010 | Frank et al. | 340/932.2 |
| 2011/0022269 A1 * | 1/2011 | Nakazono et al. | 701/41 |
| 2011/0063131 A1 * | 3/2011 | Toledo et al. | 340/932.2 |
| 2011/0254674 A1 * | 10/2011 | Wang et al. | 340/435 |
| 2011/0260887 A1 | 10/2011 | Toledo et al. | |
| 2012/0197492 A1 * | 8/2012 | Schneider et al. | 701/41 |
| 2012/0256766 A1 | 10/2012 | Lavoie | |

FOREIGN PATENT DOCUMENTS

EP    2291835 A1    3/2011

* cited by examiner

*Primary Examiner* — Kerri McNally
(74) *Attorney, Agent, or Firm* — Frank MacKenzie Brooks Kushman, P.C.

(57) ABSTRACT

A method of determining an object distance from a vehicle includes sending a first transmission signal during a first burst period from a first transmitter, listening for a first reflection signal during a first listen period in a receiver, and sending a second transmission signal during a second burst period from a second transmitter. The second transmission signal is sent based on a time when the first transmission signal is sent.

20 Claims, 4 Drawing Sheets

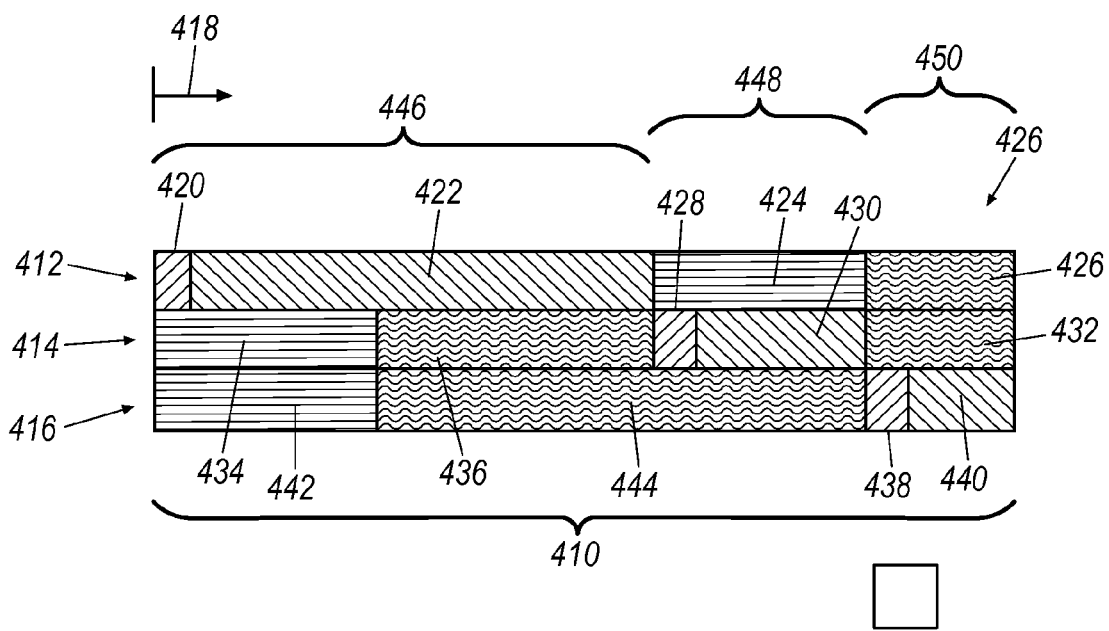
FIG. 4
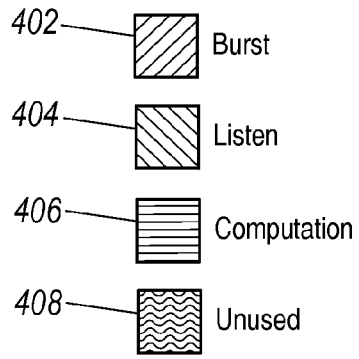

PARK ASSIST OBJECT DISTANCE MEASUREMENT CLOCK CONTROL

BACKGROUND

When used for park assist, an ultrasonic system defines a trajectory for the vehicle, and determines a target parking slot based on the sensor readings. The parking slot can be for perpendicular or parallel parking slots, as examples. However, an error state can occur when scanning for a parking slot, when instead of reading reflected ultrasonic waves the sensor picks up emissions or waves emitted from other vehicles or sources. An error state can also occur when signals are reflected from other vehicles.

SUMMARY

An active park assist system relies on ultrasonic sensor technology to scan and locate a suitable parking space to assist drivers in parking their vehicles next to a curb. However, other vehicles proximate the host vehicle may also include ultrasonic emitters that can confuse the readings received by the sensor of the host vehicle and cause errors when providing results regarding objects proximate the host vehicle. As such, a time of flight system is implemented that has a very high speed trigger that can open and close windows for receipt of reflected data within specific times when the data should be reflected from nearby objects, discarding data that falls outside the window that may emit from other transmitters. Different park assist systems on the vehicle emit their signals within different event timing windows to avoid having them interfere with one another.

A method of determining an object distance from a vehicle includes sending a first transmission signal during a first burst period from a first transmitter, listening for a first reflection signal during a first listen period in a receiver, and sending a second transmission signal during a second burst period from a second transmitter. The second transmission signal is sent based on a time when the first transmission signal is sent.

A non-transitory computer-readable medium tangibly embodying computer-executable instructions includes steps to send a first pulse during a first burst period, listen for a first reflected signal during a first listen period, send a second pulse during a second burst period, and determine a time when the second pulse is sent based on when the first pulse is sent.

A host vehicle includes at least two transmitters positioned thereon, at least one receiver positioned thereon, and a computer. The computer is programmed to send a first burst signal during a first burst period from one of the transmitters, listen for a first reflected signal during a first listen period, send a second burst signal during a second burst period from another of the transmitters, and determine a time when the second burst signal is sent based on when the first burst signal is sent.

BRIEF DESCRIPTION OF THE DRAWINGS

FIG. 4 illustrates steps for an algorithm or method.

DETAILED DESCRIPTION

Figure 1:
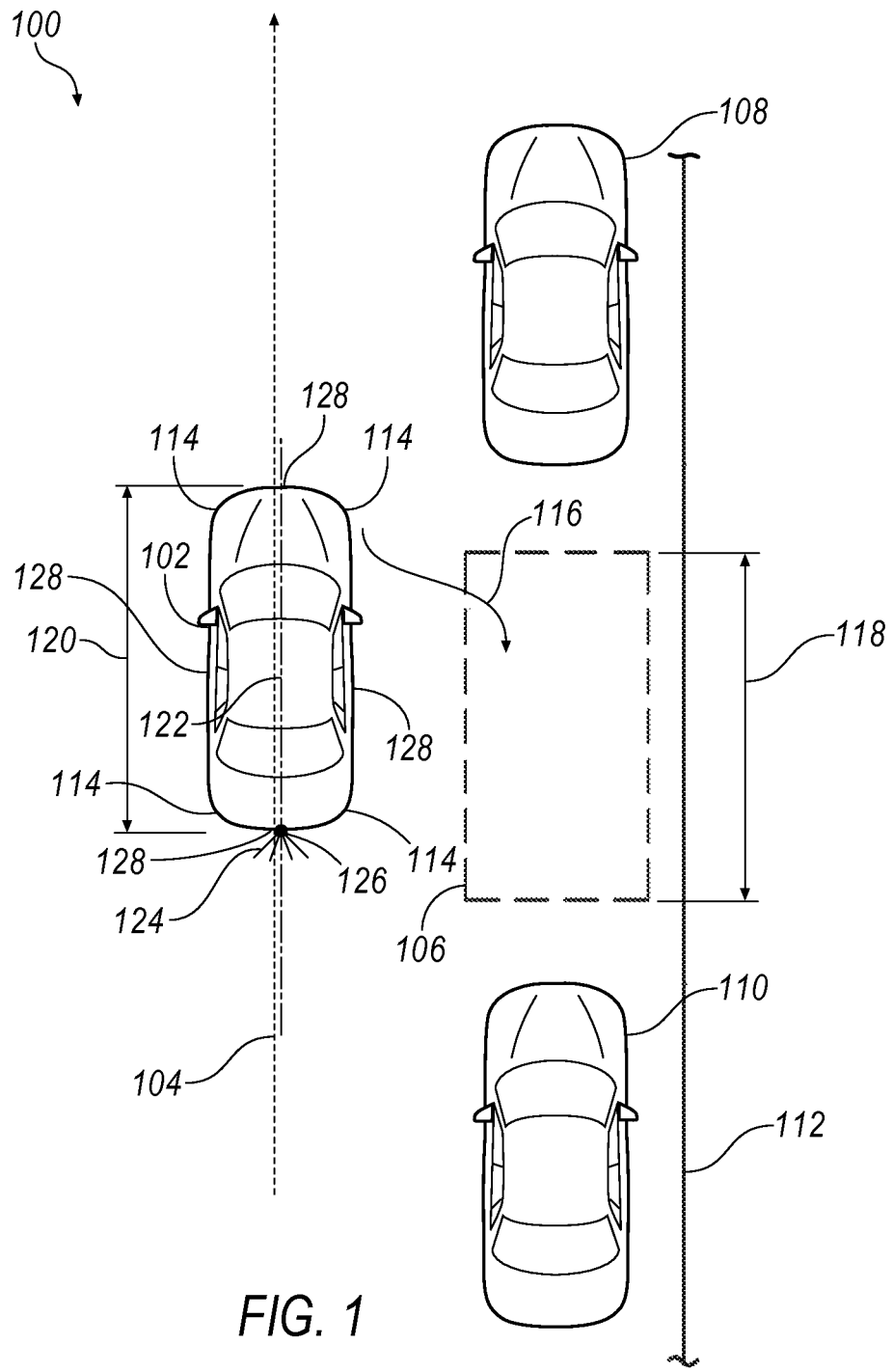
FIG. 1 illustrates a plan view of a host vehicle proximate front and rear cars that define a parking space for parking assist.

FIG. 1 shows an Active Park Assist (APA) parking assist scenario 100 in which a running or host vehicle 102, such as a car, may employ a park assist system for assisting or instructing a driver in what actions to take to park the vehicle, such as when parallel parking. As host vehicle 102 passes along a path 104, a parking space 106 is identified by the park assist system as located between two parked vehicles 108 and 110. Parking space is thus defined between vehicles 108, 110, and is also defined by a constraint on the far side, such as a curb 112. Parking space 106 may be defined or bounded by any type or number or objects or constraints, not necessarily vehicles 108, 110 and curb 112.

Figure 2:
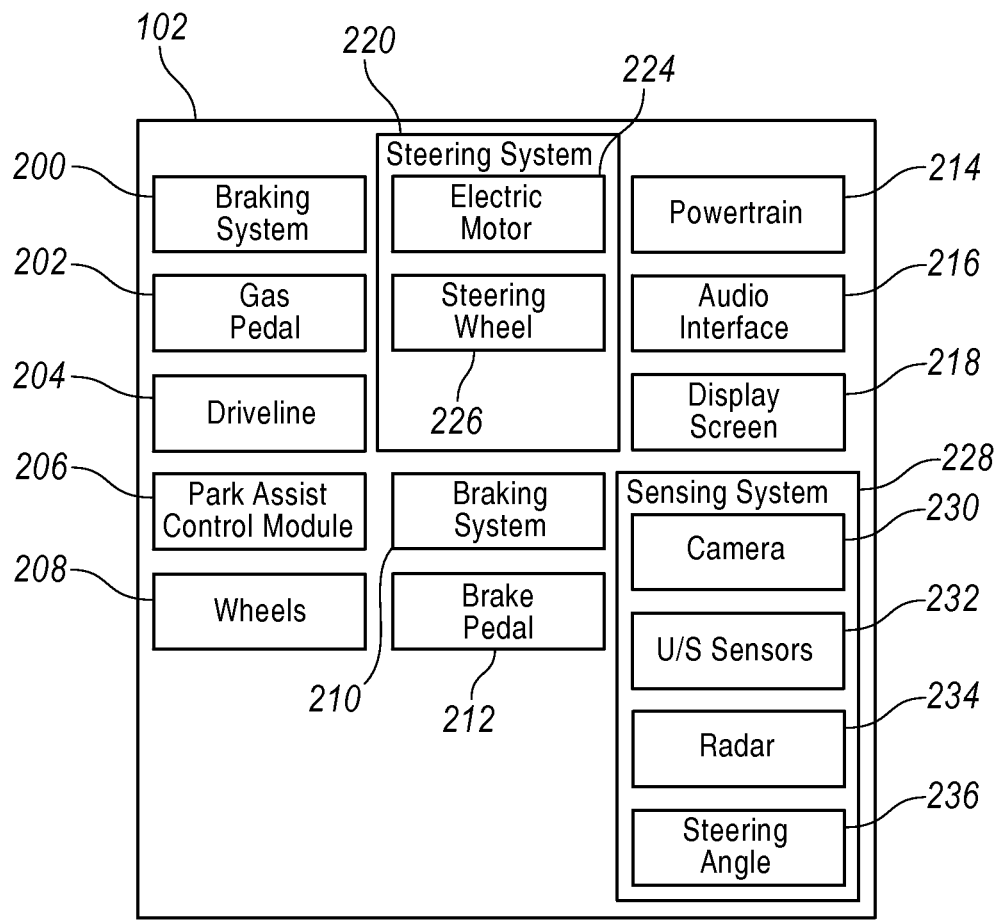
FIG. 2 illustrates elements of a host vehicle for parking assist.

Referring to FIG. 2, host vehicle 102 includes a braking system 200, a gas pedal 202, a driveline 204, a park assist control module (PACM) 206, and wheels 208. Vehicle 102 also includes a braking system 210, a brake pedal 212, a powertrain 214, an audio interface 216, and a display screen 218. A steering system 220 is shown in an example to include an electric motor 224 and a steering wheel 226. Steering system may be used in a power assisted steering system, or steering system 220 may include any type of steering system such as a conventional vacuum/hydraulic system, an electro-hydraulic power assisted system (EHPAS), or a 'steer-by-wire' system. Host vehicle 102 may include an accelerometer that measures an acceleration of vehicle 102.

In the illustrated embodiment, a sensing system 228 is operatively connected to vehicle 102 and may be coupled to PACM 206 to provide input signal(s) thereto. Sensing system 228 includes sensors for sensing the vehicle environment, such as a camera 230, ultrasonic (U/S) sensors 232 (which may include a transmitter and sensor/receiver), radar 234, and a steering sensor 236, as examples. Although not illustrated, sensing system 228 may also include systems that include but are not limited to LIDAR, thermal sensors, and GPS. As shown in FIG. 1, four transceivers or sensors 114, such as ultrasonic sensors, may be located on the left and right sides of vehicle 102 adjacent front and rear bumpers to provide full or near-full 360° coverage around vehicle 102. The number, type, and/or the location of the sensors may be other than illustrated if so desired.

Sensing system 228 may include sensors for detecting the status or mode of operation of various systems on-board the vehicle 102, such as an odometer sensor (not shown) and/or steering wheel angle sensor 236. The odometer sensors may be located on one or more of wheels 226 of vehicle 102 and/or in the driveline system 204 of vehicle 102. Steering wheel angle sensor 236 is associated with steering system 220 of vehicle 102 and may, for example, be located on steering wheel 226 or on a steering column, as an example. Vehicle 102 may also be equipped with video display screen 218 for the display of various types of information to the driver. Vehicle 102 may also include audio interface device 216 such as a speaker, chime, buzzer, or other device for generating sound.

As shown in FIG. 1, vehicle 102 is parked into parking space 106 using PACM 206. To accomplish this, at least one of sensors 114 is used to detect neighboring objects and their location relative to the position of the vehicle 102 as vehicle 102 travels along path 104 and passes objects 110, 108. In FIG. 1, the neighboring objects that define parking space 106 are shown as being the two parked vehicles 110, 108 and curb 112. It is contemplated that PACM 206 may successfully identify a parking space 106 relative to only one object or vehicle, such as either the vehicle 108 or vehicle 110, if present.

PACM 206 includes a data processing component that processes the information from the sensor(s) to evaluate whether vehicle 102 may be successfully parked in parking space 106. The data processing component may, for example, be a micro-computer based device, as is well known. Evaluation by PACM 206 may involve determining if a valid steering trajectory 116 can be performed to park vehicle 102 in parking space 106. If a valid steering trajectory 116 exists, PACM 206 deems parking space 106 to be a feasible parking space. The calculations performed by PACM 206 may include a determination of a proper slot length 118 depending upon considerations such as a length 120 of vehicle 102, and/or an achievable turning radius of vehicle 102, and/or any other geometric considerations related to vehicle 102 and/or other objects in the vicinity of parking space 106.

Movement of vehicle 102 along steering trajectory 116 may be performed in one or more parking maneuvers as may be necessary until it is properly parked. As used herein, one parking maneuver is defined as (1) moving the vehicle rearwardly from a stop into the parking space, (2) stopping the vehicle briefly within the parking space, (3) moving the vehicle forward within the parking space, and (4) then stopping and thus parking the vehicle. At least one actuation or movement of steering system 220 is usually required in association with each of the steps in the parking maneuver to achieve trajectory 116. A subsequent rearward and/or forward movement of vehicle 102 may be necessary if parking space 106 is too short relative to vehicle length 120 and/or turning radius, which defines an additional parking maneuver.

Once it is determined that vehicle 102 is properly parked in a desired parked condition, PACM 206 operates steering system 220 to return it to a centered condition. In one example, this involves actuating electric motor 224 to move steering wheel 226 and associated components of steering system 220 so that the steerable road wheels of vehicle 102 are aligned parallel with a longitudinal (front-to-rear) axis 122 of vehicle 102.

Figure 3:
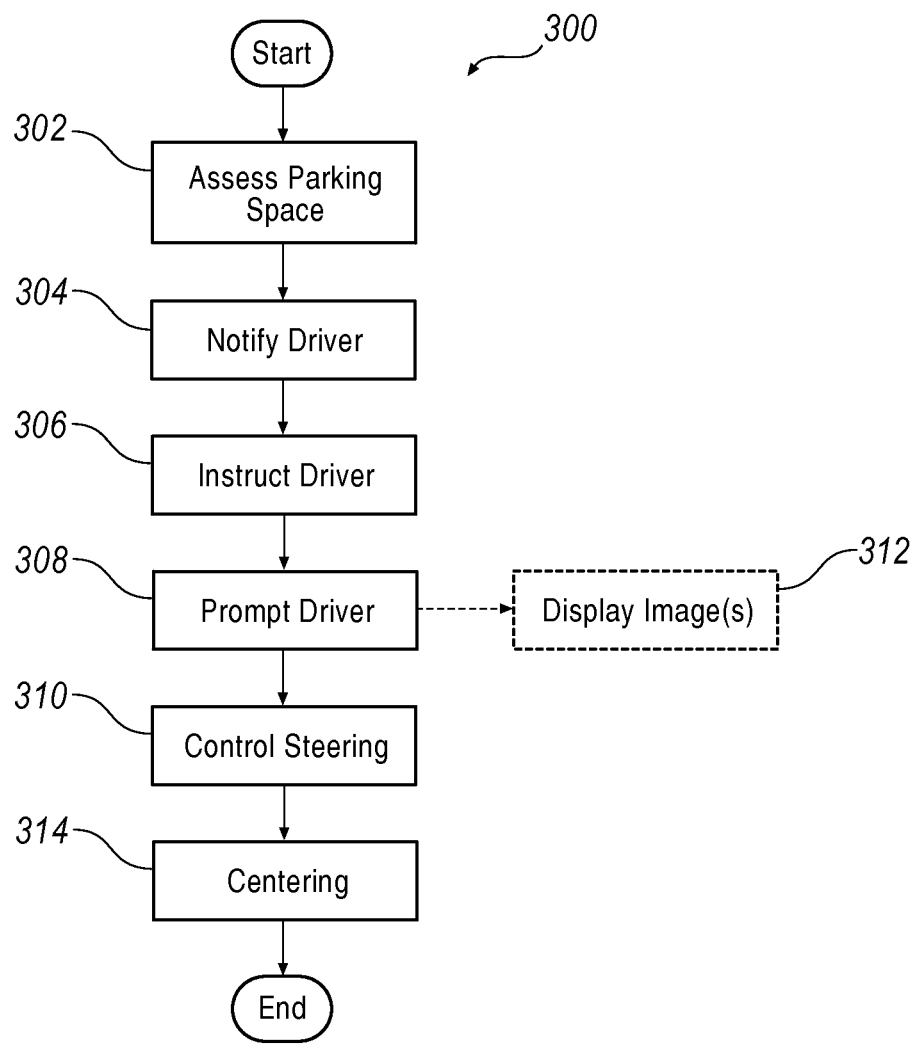
FIG. 3 illustrates a flowchart of a method for parking a vehicle.

Referring to FIG. 3, a flow chart 300 shows a method for parking a vehicle. At first step 302 a processing module, such as PACM 206, determines if there is a feasible parking space available for parking of vehicle 102. This may be accomplished, for example, using signals from sensor(s) 114 of sensing system 228. A feasible parking space is one, such as parking space 106, that is sufficiently large for vehicle 102 to fit into using the park assist system with which it is equipped.

If the parking space is determined at step 302 to be feasible for parking, the driver is notified or alerted at step 304 that a feasible parking space is available. The notification may be delivered via a visual and/or audible signal interface to, for instance, display screen 218 within vehicle 102. Alternatively, the visual interface may be a graphic image, icon, or other non-text representation on display screen 218. Such a visual interface may be located at any appropriate location in vehicle 102, such as an overhead console. Audible signals may be via audio interface 216, as another example.

Next, at step 306 the driver is instructed to stop the vehicle and to accept the system assistance to park. This instruction may be delivered visually and/or audibly, and may be accomplished by the same interface(s) used in step 304. Once the driver has stopped vehicle 102, at step 308 the driver is prompted to remove hands from the steering control device of the steering system (steering wheel 226, for example) and to actuate a brake control device (such as brake pedal 212) and a transmission control device (such as a gear select lever or button) to engage or shift the transmission of powertrain system 214 into reverse gear.

At step 310 the park assist system takes over control of steering system 224 to execute steering trajectory 116. In one example, the park assist system generates signals to prompt the driver to take actions necessary to drive the vehicle backwards and pull forward (in one or more parking maneuvers) to achieve a parked condition of vehicle 102 in parking space 106. The parked condition may be defined, depending upon the nature and dimensions of the parking space, as when vehicle 102 is within a certain distance of one or more of the objects or features that define the space and/or within a certain angular measure of being parallel with the appropriate objects/features.

Driver actions prompted at step 308 may include actions such as actuating brake pedal 212 of braking system 210 to control the speed of the vehicle and/or actuating a transmission control device to engage or shift the transmission of the powertrain system 214 between forward and reverse gears.

As indicated at step 312, the method may optionally include displaying to the driver an image of the parking space environment. For example, an image 124 from a rear view camera 126 may be displayed on a video display screen. In another example, a simulated or virtual top view showing the vehicle and its location relative to the parking space may be displayed on display screen 218. Either of these images may be overlaid with lines and/or other symbols depicting the desired steering trajectory 116. In one embodiment, radar systems 128 may be included in the front, and/or rear, and/or sides of vehicle 102.

When the park assist system has determined that vehicle 102 is properly parked and the final movement of the parking maneuver is complete, the method progresses to step 314 where steering system 220 is operated to place it in a centered condition between surrounding objects such as vehicles 108, 110, or generally in line with curb 112 and/or path 104. This may involve actuating electric motor 224 that provides power boost to the steering system so as to move steering wheel 226 along with associated components of steering system 220 until vehicle 102 wheels are parallel with axis 122 of vehicle 102.

Although the parking space 106 has been described as a parallel parking space between a forward first object and a rearward second object, the parking space may alternatively be a rear perpendicular parking space, such as found in typical multi-vehicle parking lots and garages. Additionally, parking space 106 has been described as being on the right side of the vehicle 102, but alternatively the park assist system may be used to identify a parking space on the left side of vehicle 102.

Referring now to FIG. 4, a method or algorithm 400 shows exemplary steps that correspond to signal overlap avoidance. Method 400 includes steps that include burst 402, listen 404, computation 406, and unused 408. Method 400 shows one cycle 410 of a repeating cycle of burst and listen periods for park assist 412, rear park aid 414, and front park aid 416. The repeating cycle occurs over a time period, illustrated as time axis 418.

During park assist 412, an APA transmission signal 420 is sent for a burst period and is, in one example, 1.5 ms in duration. An APA listen period 422 follows signal 420, and is 22.5 ms in one example. APA computation 424 occurs subsequent to listen period 422 and for an exemplary duration of 14 ms, and period 426, 5 ms in duration, is unused. At the same time during cycle 410, rear park aid 414 and front park assist 416 also transmit, receive, and perform computations as well.

Thus, in the illustrated example, rear park aid burst 428 occurs for a duration of 1.5 ms, and a park aid listen 430 period of 12.5 ms subsequently occurs. Burst period 428 and listen period 430 are timed so as to overlap with APA computation period 424, thus minimizing the likelihood that any reflections from signals emitted during APA burst period 420 will be detected during rear assist listen period 430, and also removing the possibility that emission during burst period 428 will be detected during listen period 422. Rear park aid 414 also includes an unused period 432 that corresponds to the 5 ms unused period 426. Rear park aid 414 also includes a computation period 434 and an unused period 436 as well, the sum of which correspond to the timeframe allocated or park assist burst and listen periods, 420, 422.

Similarly, front park aid 416 also includes a rear park aid burst period 438 of 1.5 ms, and a rear park aid listen period 440 of 3.5 ms. Front park aid 416 computations 442 are also performed during computation period 434 for rear park aid 414. In such fashion, an unused portion 444 results as well for front park aid 416.

Park assist period 412, and rear and front park aid periods 414, 416 are used to determine object distance, for the purposes of assessing a parking spot, such as in a parallel or a perpendicular parking arrangement. That is, a parallel parking arrangement as described above may be performed using park assist, or park assist may be used to assess a perpendicular or angle parking arrangement where the car or host vehicle is driven into the parking slot, either forward or in reverse. Object distances for such purposes are used to determine by sending a first transmission signal or pulse from the vehicle, such as burst 420, listening for a first reflected signal in a receiver on the vehicle during listen period 422, and sending a second transmission signal from the vehicle, such as burst 428, that is sent based on a time when the first transmission signal 420 is sent. That is, a first time window 446 is determined that includes the first burst period 420 and the first listen period 422, and the second signal 428 is sent after the first time window 446.

A second time window 448 is also determined that includes burst period 428 and listen period 430. During listen period, a reflected signal may be received as a result of the signal emitted during period 428. A third time window 450 is also included that includes burst period 438 for front park aid 416 as well as listen period 440, during which a reflected signal may be obtained as well as a result of the signal from burst period 438.

Listen periods 422, 430, and 440 have durations that are determined based on whether it would be relevant to the task at hand (APA, rear park aid, front park aid) if reflected signals are received during the exemplary times discussed. That is, APA listen period is 22.5 ms, a relatively long time frame, to allow for reflected signals from afar and at distances where parallel or perpendicular parking slots may be. Rear park aid listen period 430 is 12.5 ms in duration, shorter than the listen period 422 for APA 412, but longer than the listen period 440 for front park aid 416. That is, rear park aid listen period 430 is relatively long because of the greater difficulty of a driver to see objects that are behind the vehicle. Thus a driver obtains a longer advance warning of objects that may be behind the vehicle. However, the listen period 440 for front park aid 416 is relatively short, at 3.5 ms, as objects in front of the vehicle are generally visible to the driver and it is of most interest to ensure objects very close to the vehicle are detected, to avoid bumping during the parking process.

The second time window 448 includes burst period 428 and listen period 430, for listening for reflections from objects. Third time window 450 likewise includes burst period 438 and listen period 440, also for listening for reflections from objects. As such, a parking algorithm may be generated based on timing between the first transmission signal and the first listen period and whether a signal is detected during the first listen period. The parking algorithm may also have inputs based on the front park aid, the rear park aid, or both based on timing of any signals that may be received during their respective listening periods.

Further, because of the overlapping nature of the periods of burst 402, listen 404, computation 406, and unused 408, the inputs for the algorithm for APA 412 are determined during second time window 448 and during a time after which listening is completed in APA 412.

It is contemplated that any device that can determine object distance using an emitted and received signal may be used in method 400. As described, vehicle 102 includes ultrasonic transceivers 114 as well as radar devices 128. However, method 400 is not so limited and method 400 may be implemented using any device for sending and receiving signals to determine object distance, such as a laser and a monochromatic light sensor. Thus, the times illustrated for method 400 are exemplary and particular to ultrasonic devices, but the times may vary depending on the algorithm, size of the vehicle, and types of emitters and sensors being used.

Further, it is contemplated that timing of signals emitted may be precisely controlled using very accurate timing devices, such as a global positioning system (GPS) or an atomic clock. Each of these devices may be accessible to vehicle 200 and thus may be relied upon to provide very accurate triggers for timing of events, to avoid overlapping of timing events in method 400. In one example, such clocks provide a 200 ns accuracy. Thus, because of the clock control and the high accuracy trigger capability, signals are detected during control burst periods and if signals are reflected during the listen periods, there is a high likelihood that the detected or reflected signal corresponds to its burst signal. Further, because listen periods do not remain open, there is also less likelihood that the detected signals emitted from emitters that are placed on other vehicles.

Further, although method 400 includes time division or sharing, it is contemplated that instead of time sharing, different frequencies may instead be used to distinguish the various operations between rear park aid, front park aid, and park assist. That is, in referring back to FIG. 4, instead of using time sharing for the different operations between park assist 412, rear park aid 414, and front park aid 416, different frequencies may be sent and detected simultaneously, and distinguished according to frequency instead of via the timing of signals as described. Such operation can typically be performed without modification of existing hardware. However, according to one embodiment, signal filters may be included that distinguish operation between park assist 412, rear park aid 414, and front park aid 416, but such an arrangement typically would include hardware modifications.

PACM 206 may include a computer or a computer readable storage medium implementing method or algorithm 400. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method comprising:
sending a first transmission signal during a first burst period from a rear park aid;
listening for a first reflection signal during a first listen period;
sending a second transmission signal from a front park aid after the first listen period;
listening for a second reflection signal during a second listen period; and
performing park aid computations based on the first and second reflection signals at the same time.

2. The method of claim 1, further comprising:
determining a first time window that is comprised of the first burst period and the first listen period; and
sending the second transmission signal after the first time window.

3. The method of claim 2, further comprising:
determining a second time window that is comprised of a second listen period; and
listening for a second reflection signal during the second listen period.

4. The method of claim 3, further comprising determining inputs for a parking algorithm based on a first timing between the first transmission signal and the first listen period and whether a signal is detected during the first listen period.

5. The method of claim 4, further comprising determining inputs for the parking algorithm from at least one of the front park aid and the rear park aid based on a second timing between the second transmission signal and the second listen period and whether a signal is detected during the second listen period.

6. The method of claim 4, wherein the inputs are determined during the second time window.

7. The method of claim 2, wherein sending the first transmission signal further comprises sending one of an ultrasonic signal and a radar signal.

8. The method of claim 1, wherein the time of the second signal transmission is based on one of a global positioning system (GPS) and an atomic clock.

9. A non-transitory computer-readable medium tangibly embodying computer-executable instructions comprising steps to:
send a park assist burst during a first time window;
listen for a park assist reflected signal during the first time window;

send a rear park aid burst during a second time window;

listen for a rear park aid reflected signal during the second time window;

send a front park aid burst during a third time window;

listen for a front park aid reflected signal during the third time window; and performing park assist computations based on the park assist reflected signal during the second time window.

10. The computer readable medium of claim 9, wherein the second time window is longer than the third time window.

11. The computer readable medium of claim 10, further comprising steps to:

determine inputs for a parking algorithm based on a first timing between the rear park aid burst and a first listen period corresponding to the listen for rear park aid reflected signal step and further based on a second timing between the front park aid burst and a second listen period corresponding to the listen for a front park aid reflected signal step.

12. The computer readable medium of claim 11, further comprising steps to determine the inputs for the parking algorithm during the second time window.

13. The computer readable medium of claim 9, further comprising steps to:

access a precise clock time based on one of a clock for a global positioning system (GPS) and an atomic clock; and base a trigger for the time when the front park aid burst is sent on the precise clock time.

14. A host vehicle comprising:

a first transceiver positioned proximate a rear bumper;

a second transceiver positioned proximate a front bumper; and a computer programmed to in response to actuation of a brake pedal while the host vehicle is proximate an identified parking space, send a first burst signal during a first burst period from the first transceiver, listen for a first reflected signal during a first listen period, send a second burst signal from the second transceiver during a second burst period, listen for a second reflection signal during a second listen period, and perform computations based on the first and second reflection signals.

15. The host vehicle of claim 14, wherein the computer is further programmed to:

determine a first time window that is comprised of the first burst period and the first listen period; and send the second burst signal after the first time window.

16. The host vehicle of claim 15, wherein the computer is further programmed to:

determine a second time window that is comprised of the second burst period and the second listen period, wherein the first time window is greater than the second time window.

17. The host vehicle of claim 16, wherein the computer is further programmed to determine inputs for a parking algorithm based on a first timing between the first burst signal and the first listen period.

18. The host vehicle of claim 17, wherein the computer is further programmed to determine inputs for the parking algorithm based on one of the first transceiver and the second transceiver based on a second timing between the second burst signal and the second listen period.

19. The host vehicle of claim 14, wherein the first and second transceivers are comprised of a combination of at least one of an ultrasonic transmitter and a radar transmitter and at least one of an ultrasonic receiver and a radar receiver.

20. The host vehicle of claim 14, wherein the computer is further programmed to:

access a precise clock time based on one of a clock for a global positioning system (GPS) and an atomic clock; and base a trigger for the time when the second burst signal is sent on the precise clock time.

* * * * *